United States Patent
Hall et al.

(10) Patent No.: US 10,336,541 B2
(45) Date of Patent: Jul. 2, 2019

(54) AUTOMATED STORAGE AND RETRIEVAL SYSTEM WITH RETRACTABLE MOUNTINGS

(71) Applicants: David R. Hall, Provo, UT (US);
Joseph Blanch, Provo, UT (US);
Andrew Priddis, Mapleton, UT (US);
Eimi Priddis, Mapleton, UT (US);
Kevin Cheatham, Provo, UT (US);
Justin Robinson, Provo, UT (US)

(72) Inventors: David R. Hall, Provo, UT (US);
Joseph Blanch, Provo, UT (US);
Andrew Priddis, Mapleton, UT (US);
Eimi Priddis, Mapleton, UT (US);
Kevin Cheatham, Provo, UT (US);
Justin Robinson, Provo, UT (US)

(73) Assignee: Hall Labs LLC, Provo, UT (US)

( * ) Notice: Subject to any disclaimer, the term of this patent is extended or adjusted under 35 U.S.C. 154(b) by 322 days.

(21) Appl. No.: 15/278,545

(22) Filed: Sep. 28, 2016

(65) Prior Publication Data
US 2018/0086557 A1 Mar. 29, 2018

(51) Int. Cl.
*B65G 1/06* (2006.01)

(52) U.S. Cl.
CPC ..................... *B65G 1/06* (2013.01)

(58) Field of Classification Search
CPC ....... B65G 1/0478; B65G 1/06; G07F 11/165; G07F 11/46; G07F 11/60; G07F 11/42
See application file for complete search history.

(56) References Cited

U.S. PATENT DOCUMENTS

| | | | | |
|---|---|---|---|---|
| 3,750,804 A * | 8/1973 | Lemelson | ............ | B65G 1/0435 414/276 |
| 5,791,512 A * | 8/1998 | Kanatsuka | .............. | G07F 11/62 221/130 |
| 6,854,815 B1 * | 2/2005 | Smith | .................. | A47B 49/008 198/802 |
| 7,123,989 B2 * | 10/2006 | Pinney | ................ | G06F 19/3462 700/237 |
| 7,604,145 B2 * | 10/2009 | Percy | ...................... | G07F 11/42 221/126 |
| 8,534,494 B2 * | 9/2013 | Black, Jr. | ................ | G07F 9/026 221/126 |
| 8,991,138 B2 * | 3/2015 | Yuyama | .................. | G07F 11/16 53/235 |

(Continued)

*Primary Examiner* — Mark C Hageman

(57) ABSTRACT

The invention is an automated storage and retrieval system. Positionable objects are stored in columns within a frame. When a user requests an object, the objects are selectively relocated until the requested object is brought to an access point. The objects are relocated by planar motion mechanisms attached to the walls of the frame. When not moving, the objects are suspended from mountings that extend from the same walls that the planar motion mechanisms are attached to. The mountings are controlled by actuators within the walls. The mountings are retractable to allow the planar motion mechanisms to pass. Each of the objects is supported by more than one mounting so that support is not withdrawn when any one mounting is retracted to allow a planar motion mechanism to pass. The design allows objects to be arranged in more than two columns within an automated storage and retrieval system.

20 Claims, 17 Drawing Sheets

(56) References Cited

U.S. PATENT DOCUMENTS

| | | | | |
|---|---|---|---|---|
| 9,044,106 B1* | 6/2015 | Smith | ............... | A47F 3/06 |
| 9,056,718 B2* | 6/2015 | Ito | ............... | B65G 1/0407 |
| 9,511,830 B2* | 12/2016 | Corcoran | ............ | B63C 15/00 |

* cited by examiner

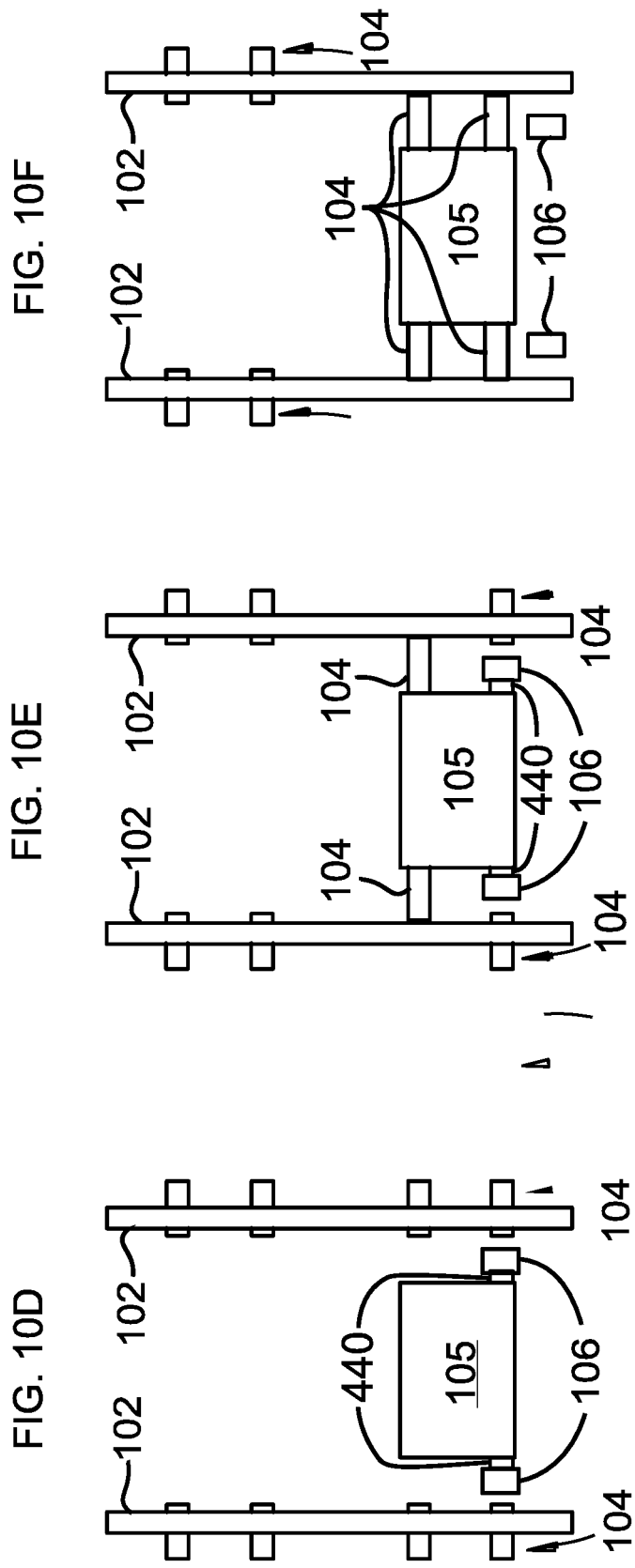

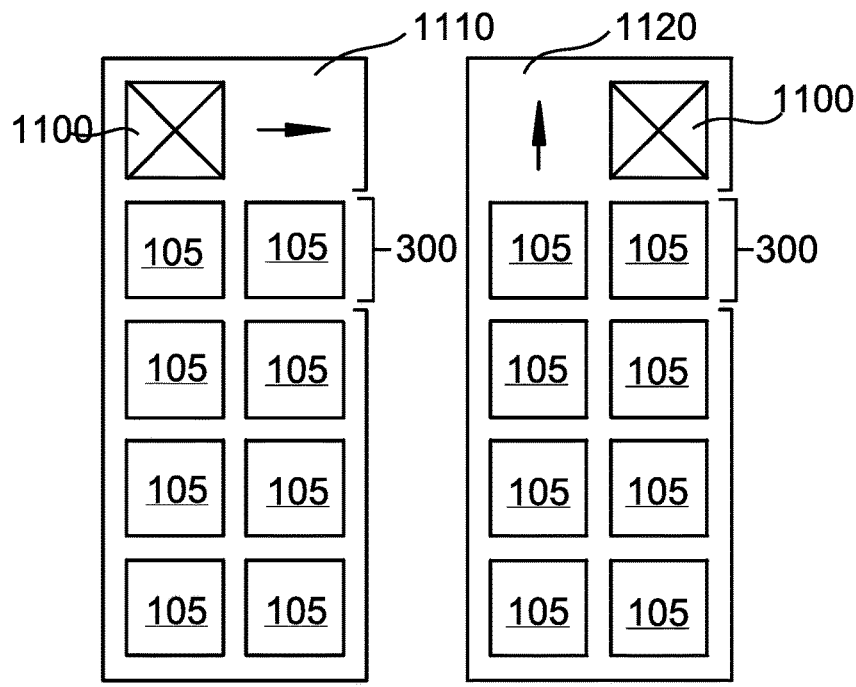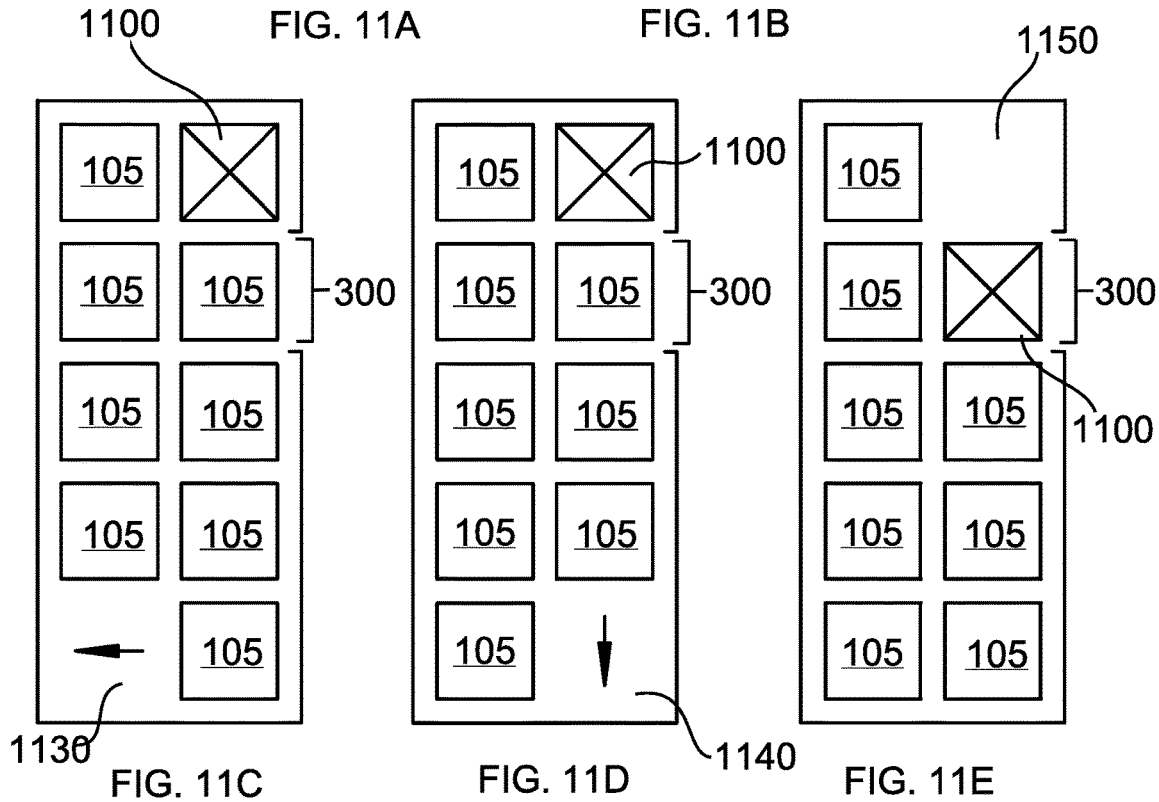

AUTOMATED STORAGE AND RETRIEVAL SYSTEM WITH RETRACTABLE MOUNTINGS

CROSS-REFERENCES

Technical Field

This invention relates generally to the field of storage systems, and more specifically to automatic storage and retrieval systems.

Background

Homes, offices, warehouses, and other buildings are in constant need of more storage space. Areas within the buildings—closets, cupboards, attics, shelves, and the like—are often set apart for this purpose, but these storage spaces are seldom used efficiently or to full capacity. Even when the spaces are used to full capacity, maintaining order and accessibility presents a further challenge. Accordingly, various storage systems have been designed to improve the efficiency, accessibility, and organization of various storage spaces.

One such storage system design is an automated storage and retrieval system. An automated storage and retrieval system allows a user to select a desired item or set of items and instruct that the items be brought by mechanical means from distant storage areas to a convenient access point. Thus, automated storage and retrieval systems provide a convenient method for locating and accessing goods while utilizing space that would otherwise be difficult to access.

A wide variety of automated storage and retrieval systems exist in the prior art. Larger scale systems—for example, those used in a warehouse setting—use a variety of automated conveyor belt and/or transport vehicle devices to store and retrieve items. In such cases, items are stacked in multiple layers and space is allotted on at least one side of each stack to access and remove an item at any location within the stack. In smaller scale settings, storage and retrieval systems have been designed that rearrange stored items within a stack until a desired item is accessible at a designated access point.

One example of the latter is a revolving carousel. In the carousel, items are rearranged by moving around a circular track, allowing each item to pass through an access point in turn. This requires less space than the larger scale systems described above; however, this design is still not the most efficient given that space must still be allotted on each circular portion of the track to allow items to pass by each other.

An improvement on the revolving carousel optimizes space by moving items only linearly. In such a method, repeatedly moving one item horizontally from either the top or bottom of a stack and then moving all of the items remaining in the stack vertically to fill the vacant space, creates a circular motion, such that a desired box eventually reaches an access point. Certain embodiments utilize tracks and wheels or conveyors for horizontal movement and lifts for vertical movement. While this linear movement method has a smaller space requirement than the carousel, current embodiments still have several disadvantages.

One disadvantage is that, in most of the current embodiments, each column of items is supported by the bottom item, which requires that each item in the column be able to bear the weight of all items above it. This places structural requirements on each item that increase costs and waste space. Another disadvantage is that the system can only function if it is at full capacity (meaning it has exactly one vacancy). Finally, a disadvantage is that an item must pass through the full rotation before it can be accessed, rather than allowing often-used items to maintain positions of easy access and less-used items to maintain more difficult positions.

One possible way to solve some of these problems involves hanging the items on front and back walls, while moving the items with planar motion mechanisms mounted to adjacent side walls. However, in spite of these improvements, one further disadvantage remains: such a system is limited to only two columns of items. This limitation is a result of the positioning of the mechanisms moving the items and the necessary proximity of each item to a front or back wall so that the items can hang from the walls.

In light of the foregoing, what is needed is an automated storage and retrieval system that allows items to be hung individually on walls, but that allows for more than two columns of items.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow three or more columns of items within an automated storage and retrieval system.

Consistent with the foregoing, an automated storage and retrieval system is disclosed. The automated storage and retrieval system comprises a frame comprising one or more walls and one or more planar motion mechanisms proximate to the one or more walls. The one or more walls comprise a plurality of actuators, which comprise mountings that extend from and retract into the one or more walls. The mountings extend to suspend one or more positionable objects from the one or more walls, and the mountings retract when not suspending the one or more positionable objects from the one or more walls. The one or more planar motion mechanisms selectively relocate the suspended one or more positionable objects past retracted mountings within the frame.

In some embodiments, the one or more positionable objects are arranged in different configurations within the frame, including in two columns or three or more columns. In some embodiments, the one or more positionable objects have connection points that mate with the one or more planar motion mechanisms and the mountings, or the one or more planar motion mechanisms comprise connectors within the one or more planar motion mechanisms that extend from and retract into the one or more planar motion mechanisms by means of actuators within the one or more planar motion mechanisms. In some embodiments, the actuators within the one or more walls are solenoids, sometimes controlled by mechanical switches and sometimes controlled by a microcontroller. In some embodiments, the mountings or the one or more planar motion mechanisms comprise electrical conductors that provide power to the one or more positionable objects. In different embodiments, the one or more positionable objects comprise storage bins or appliances. In some embodiments, the one or more planar motion mechanisms comprise electromechanical mechanisms, preferably H-bots. The automated storage and retrieval system may comprise one or more access ports or a user interface in certain embodiments. Finally, in one embodiment, the suspended one or more positionable objects are selectively relocated past the retracted mountings in a revolving clockwise or counterclockwise sequence, and in another embodiment, they are selectively relocated in a non-revolving sequence.

BRIEF DESCRIPTION OF THE DRAWINGS

A more particular description of the invention briefly described above is made below by reference to specific embodiments depicted in drawings included with this application, in which:

FIG. 10D depicts a two-dimensional view of one embodiment of the one or more planar motion mechanisms selectively relocating one of the suspended one or more positionable objects past retracted mountings;

FIG. 10E depicts a two-dimensional view of one embodiment of the one or more planar motion mechanisms selectively relocating one of the suspended one or more positionable objects past retracted mountings;

FIG. 10F depicts a two-dimensional view of one embodiment of the one or more planar motion mechanisms selectively relocating one of the suspended one or more positionable objects past retracted mountings;

FIG. 11A depicts the suspended one or more positionable objects being selectively relocated past retracted mountings in a revolving clockwise or counterclockwise sequence;

FIG. 11B depicts the suspended one or more positionable objects being selectively relocated past retracted mountings in a revolving clockwise or counterclockwise sequence;

FIG. 11C depicts the suspended one or more positionable objects being selectively relocated past retracted mountings in a revolving clockwise or counterclockwise sequence;

FIG. 11D depicts the suspended one or more positionable objects being selectively relocated past retracted mountings in a revolving clockwise or counterclockwise sequence;

FIG. 11E depicts the suspended one or more positionable objects being selectively relocated past retracted mountings in a revolving clockwise or counterclockwise sequence;

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
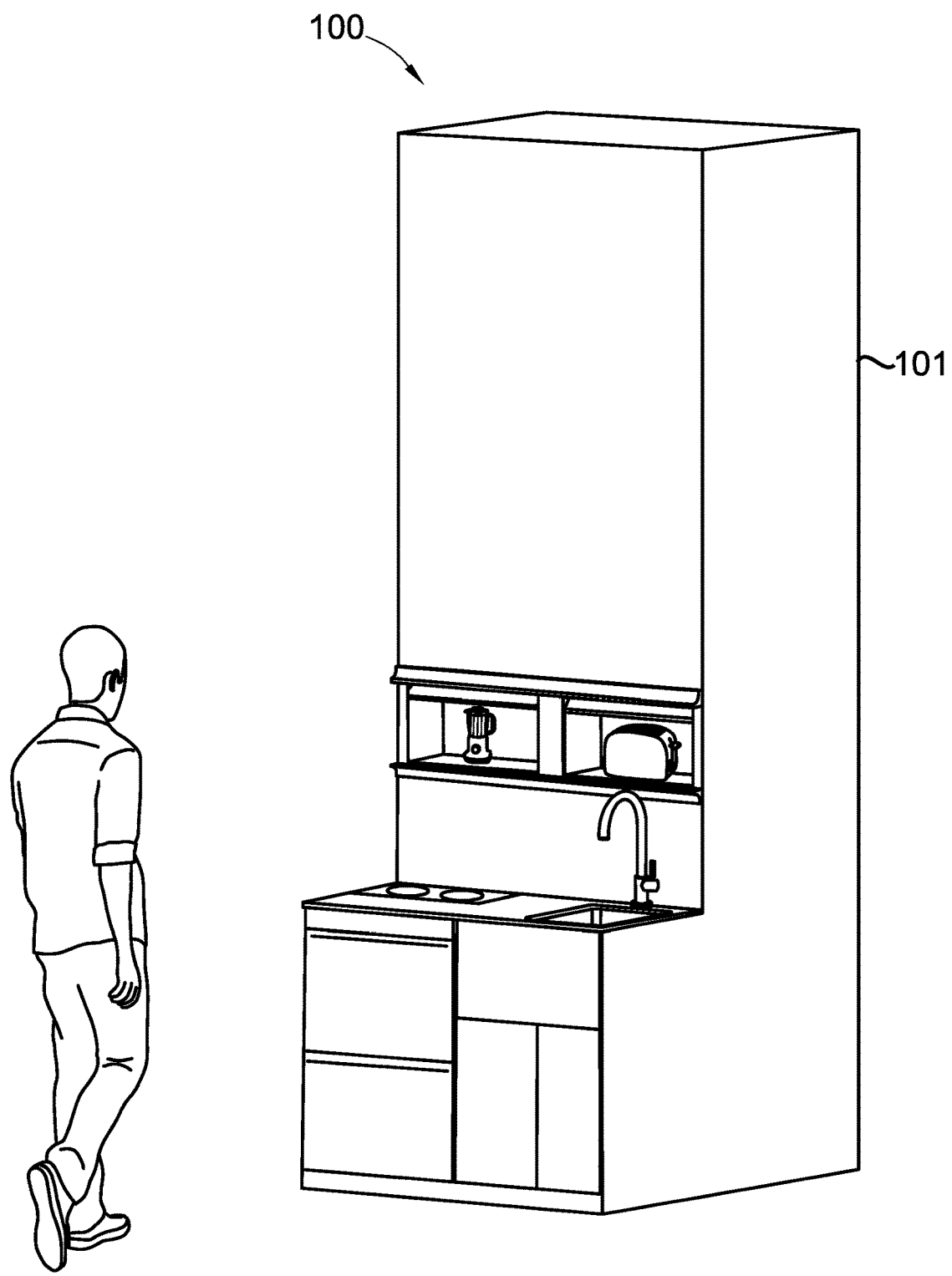
FIG. 1 depicts the exterior of one embodiment of an automated storage and retrieval system.

FIG. 1 depicts the exterior of one embodiment of an automated storage and retrieval system 100. The automated storage and retrieval system 100 comprises a frame 101, which can be seen from this exterior view. The automated storage and retrieval system 100 can be useful for many applications, including for storing appliances in a kitchen, as depicted in FIG. 1.

Figure 2:
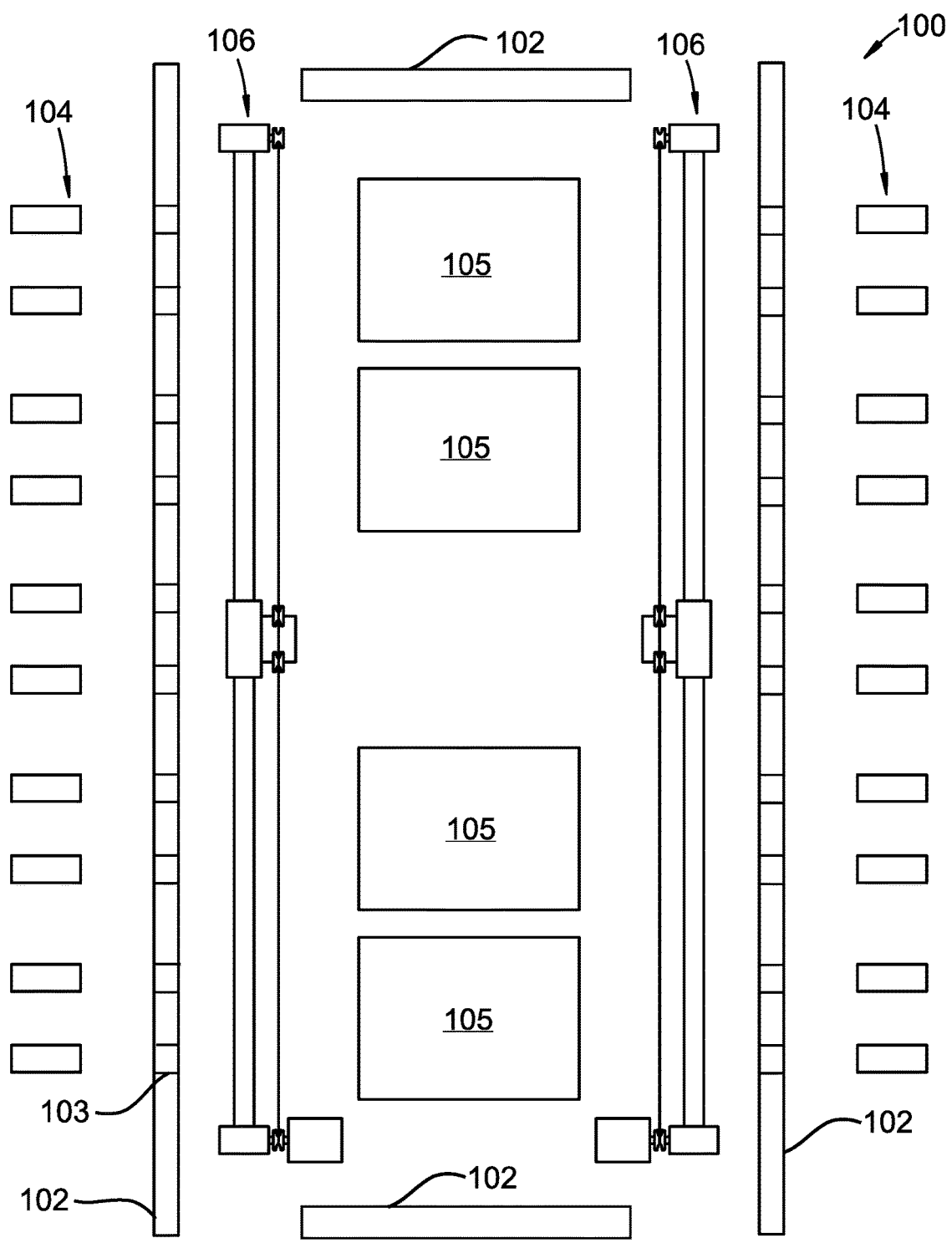
FIG. 2 depicts an exploded view of one embodiment of an automated storage and retrieval system.

FIG. 2 depicts an exploded view of an embodiment of an automated storage and retrieval system 100. The automated storage and retrieval system 100 comprises a frame 101 comprising one or more walls 102 and one or more planar motion mechanisms 106 proximate to the one or more walls 102. The one or more walls 102 comprise a plurality of actuators 103, which comprise mountings 104 that extend from and retract into the one or more walls 102. The mountings 104 extend to suspend one or more positionable objects 105 from the one or more walls 102, and the mountings 104 retract when not suspending the one or more positionable objects 105 from the one or more walls 102. The one or more planar motion mechanisms 106 selectively relocate the suspended one or more positionable objects 105 past retracted mountings 104 within the frame 101.

Figure 3:
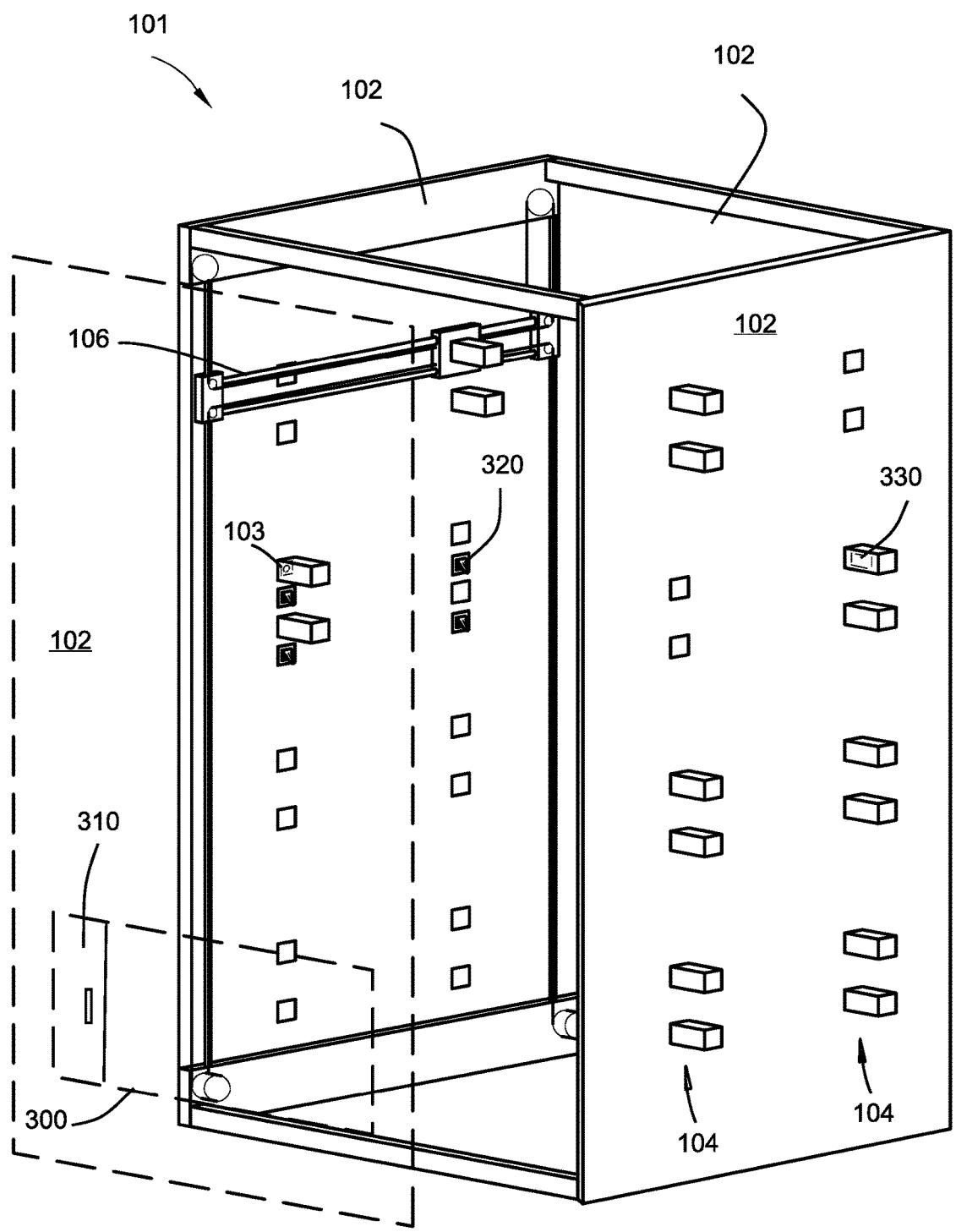
FIG. 3 depicts one embodiment of a frame.

FIG. 3 depicts one embodiment of a frame 101. The frame 101 comprises one or more walls 102. The one or more walls 102 comprise a plurality of actuators 103. The plurality of actuators 103 comprise mountings 104 that extend from and retract into the one or more walls 102. In one embodiment, the mountings 104 that extend from and retract into the one or more walls 102 are extruded rectangles that extend from and retract into the one or more walls 102 through rectangular apertures in the one or more walls 102. In other embodiments, the mountings 104 are cylindrical pins or of another configuration. The mountings 104 extend from and retract into the one or more walls 102 by means of the actuators 103 that are within the one or more walls 102. The actuators 103 apply force to the mountings 104 and move the mountings 104 through the apertures in the one or more walls 102 from the retracted position to the extended position. The mountings 104 move linearly in a direction perpendicular to the one or more walls 102. When in the extended position, the mountings 104 are able to attach to and suspend the one or more positionable objects 105 from the one or more walls 102. When not suspending the one or more positionable objects 105 from the one or more walls 102, the mountings 104 retract. When in the retracted position, the one or more planar motion mechanisms 106 are able to move past the retracted mountings 104 to selectively relocate the suspended one or more positionable objects 105. The actuators 103 are any of a variety of off-the-shelf linear actuators. In a preferred embodiment, the actuators 103 are solenoids. In another embodiment, the actuators 103 are ball screws. In yet other embodiments, the actuators 103 are roller screws, screw jacks, lead screws, hydraulic actuators, and pneumatic actuators. In one embodiment, the actuators 103 are controlled by mechanical switches 320 positioned between rows of the mountings 104. In another embodiment, the actuators 103 are controlled by a microcontroller. In one embodiment, the mountings 104 comprise electrical conductors 330. The electrical conductors 330 are housed within the mountings 104 and form an electrical connection with electrical conductors that may be housed in the one or more positionable objects 105 that are suspended from the extended mountings 104. The electrical conductors 330 supply the one or more positionable objects 105 with electrical power while the one or more positionable objects 105 are suspended from the mountings 104.

As further depicted in FIG. 3, the frame 101 further comprises one or more planar motion mechanisms 106 proximate to the one or more walls 102. A preferred embodiment comprises two planar motion mechanisms 106. In this preferred embodiment, the two planar motion mechanisms 106 are attached to two opposite walls 102. In a preferred embodiment, a same one or more of the one or more walls 102 comprise the one or more planar motion mechanisms 106 and the plurality of actuators 103. In other words, the actuators 103 are attached to the same walls 102 that the planar motion mechanisms 106 are attached to. In embodiments with two planar motion mechanisms 106, the two planar motion mechanisms 106 move in a synchronized manner such that each of the planar motion mechanisms 106 mirrors the movement of the other. The mirrored movements of the two planar motion mechanisms 106 allow the two planar motion mechanisms 106 to interact simultaneously with one of the one or more positionable objects 105.

In a preferred embodiment, the frame 101 comprises a rectangular prismatic configuration. The height, length, and width measurements of the frame 101 depend on the number and size of the one or more positionable objects 105 within. In one embodiment, the frame 101 comprises steel. In another embodiment, the frame 101 comprises a lightweight metal, such as aluminum, magnesium, titanium, beryllium alloys, or combinations thereof. In still other embodiments, the frame 101 comprises OSB, reinforced OSB, lightweight OSB, or other engineered materials, such as engineered wood, composite board, particle board, press board, plywood, wood laminate, chip board, gypsum board, cement board, carbon fiber materials, or combinations thereof. In another embodiment, the frame 101 comprises plastic. In another embodiment, the frame 101 comprises an optically transparent or semi-optically transparent material, such as glass. In one embodiment, the frame 101 further comprises one or more access ports 300. Each access port 300 comprises a window that provides access to only one of the one or more positionable objects 105. In a preferred embodiment, each access port 300 is located in a middle portion of the one or more walls 102. Embodiments with more than one access port 300 can provide access from multiple positions or from the front and back. In a preferred embodiment, each access port 300 is designatable and movable. In one embodiment, each access port 300 comprises a removable covering 310, the removable covering 310 comprising one of a group comprising a flap that opens from the top or the bottom, a sliding panel, a curtain, or a blind. In one embodiment, the removable covering 310 is mechanically driven.

Figure 4:
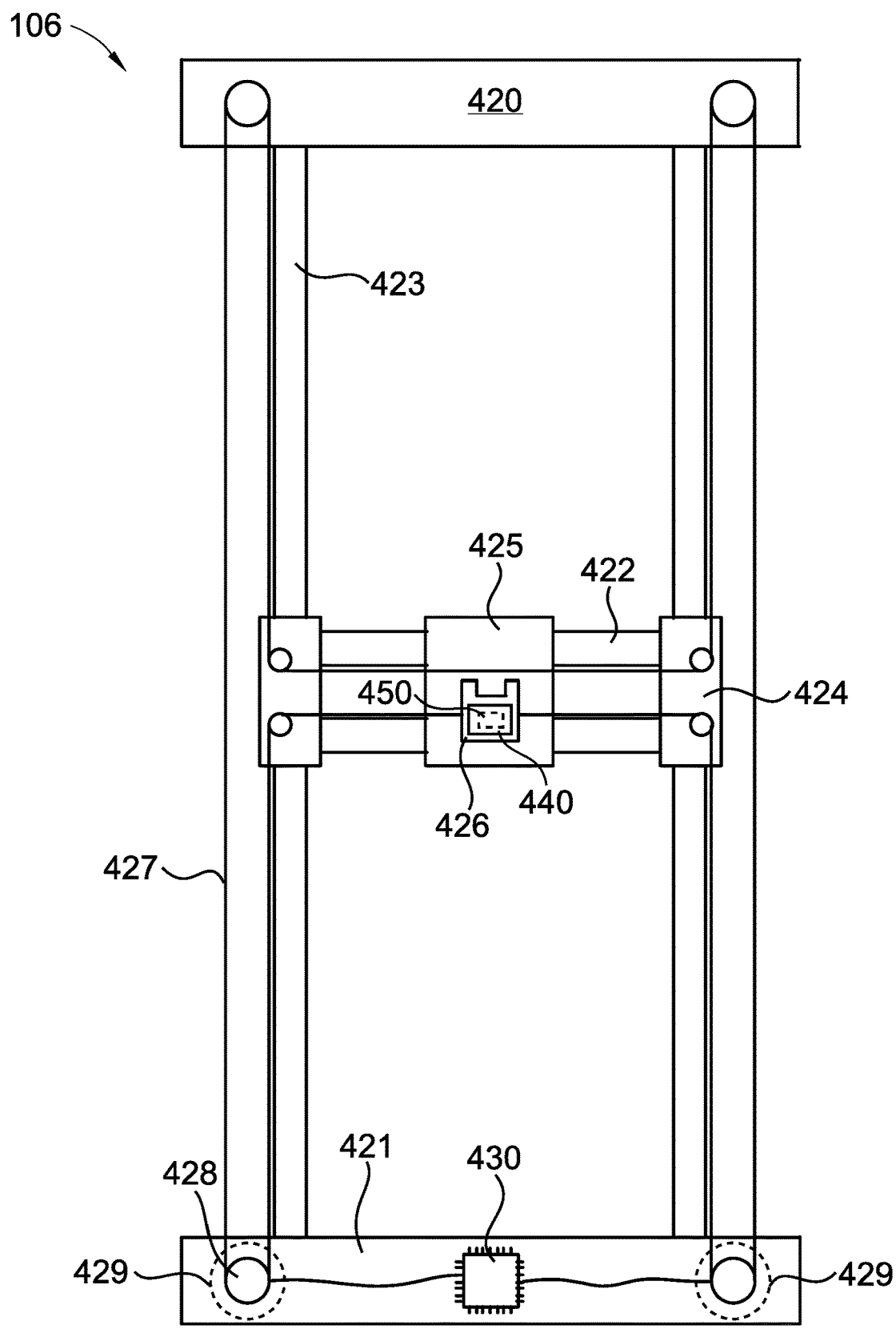
FIG. 4 depicts an embodiment of one of the one or more planar motion mechanisms.

FIG. 4 depicts an embodiment of one of the one or more planar motion mechanisms 106. The frame 101 comprises one or more planar motion mechanisms 106 proximate to the one or more walls 102 that selectively relocate the suspended one or more positionable objects 105 past retracted mountings 104 within the frame 101. A planar motion mechanism 106, as described in the present invention, is a mechanism capable of movement in two dimensions, the movement in each of the two dimensions being controlled by at least one motor. In one embodiment, the one or more planar motion mechanisms 106 comprise electromechanical mechanisms. In a preferred embodiment, the one or more planar motion mechanisms 106 comprise H-bots. One advantage of an H-bot over other planar motion mechanisms is the feature that the motors remain stationary, which decreases the mass of the moving parts, allowing for faster movement and direction changes, which decreases space requirements for an automated storage and retrieval system 100.

In one embodiment, the one or more planar motion mechanisms 106 comprise an upper support 420, a lower support 421, horizontal tracks 422, vertical tracks 423, a vertical slide table 424, a horizontal slide table 425, an end effector 426, a belt 427, pulleys 428, two electric motors 429, and a microcontroller 430. The vertical slide table 424 moves up and down vertically along the vertical tracks 423. The horizontal slide table 425 moves back and forth horizontally along the horizontal tracks 422. The end effector 426 is fixed to the horizontal slide table 425, which allows the end effector 426 to have two degrees of freedom— vertically along the vertical tracks 423 and horizontally along the horizontal tracks 422. The motors 429 drive the belt 427 through a series of pulleys 428, the belt 427 being coupled to the end effector 426. Each motor 429 is capable of applying both a positive and a reverse torque, and a combination of the torque from the two motors 429 moves the end effector 426 through the two dimensions. The microcontroller 430 provides instructions to the motors 429 as to the magnitude and direction of the torque provided. In one embodiment, the microcontroller 430 receives an input from a user of a request for a target positionable object 105. In one embodiment, the microcontroller 430 recalls from (non-volatile) memory a current position of the target positionable object 105, as well as current positions of other positionable objects 105 within the frame 101. In other embodiments, the microcontroller 430 determines the current positions of the one or more positionable objects 105 from inputs from cameras or machine reader indicia, such as bar codes or radio-frequency identification (RFID) tags. The microcontroller 430 then produces a sequence of movements necessary to bring the target positionable object 105 to an access port 300. The microcontroller 430 then instructs the motors 429 to carry out each movement in the sequence, and the target positionable object 105 is brought to an access port 300. In one embodiment, the microcontroller 430 is programmed to selectively relocate the suspended one or more positionable objects 105 past retracted mountings 104 in a revolving clockwise or counterclockwise sequence. In a preferred embodiment, the microcontroller 430 is programmed to selectively relocate the suspended one or more positionable objects 105 past retracted mountings 104 in a non-revolving sequence.

In one embodiment, the one or more planar motion mechanisms 106 comprise connectors 440 within the one or more planar motion mechanisms 106 that extend from and retract into the one or more planar motion mechanisms 106 by means of actuators within the one or more planar motion mechanisms 106. In this embodiment, the one or more positionable objects 105 are attached to the one or more planar motion mechanisms 106 via the connectors 440. In a preferred embodiment comprising two planar motion mechanisms 106, the two planar motion mechanisms 106 attach to opposite ends of one of the one or more positionable objects 105 to suspend the positionable object 105. In one embodiment, the one or more positionable objects 105 comprise connection points that mate with the one or more planar motion mechanisms 106. In one embodiment, the one or more planar motion mechanisms 106 also comprise electrical conductors 450. The electrical conductors 450 are contained within the connectors 440 and couple with electrical conductors that may be found in the one or more positionable objects 105 to supply the one or more positionable objects 105 with electrical power.

Figure 5:
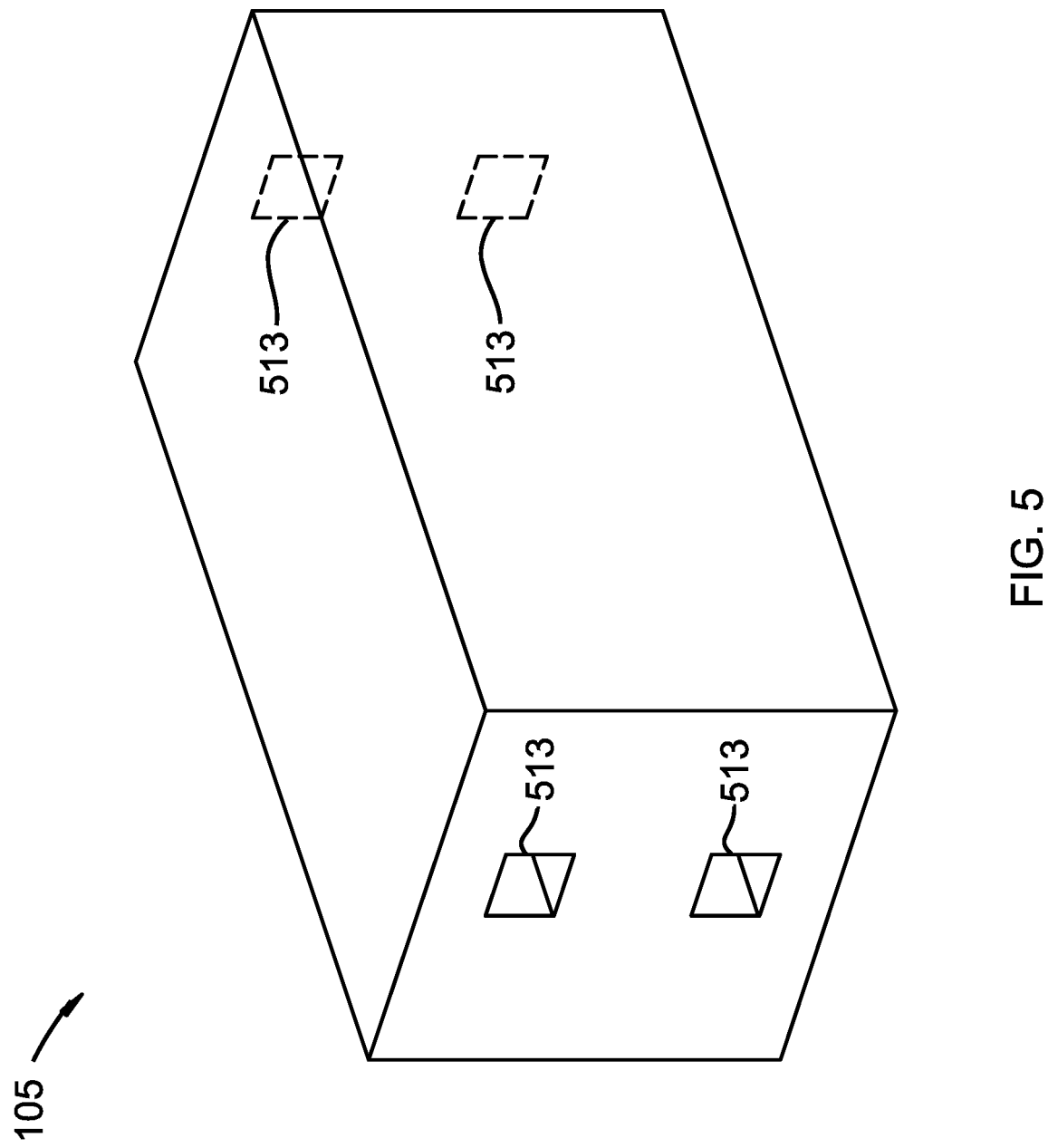
FIG. 5 depicts an embodiment of one of the one or more positionable objects.

FIG. 5 depicts an embodiment of one of the one or more positionable objects 105. The one or more positionable objects 105 are suspended from the one or more walls 102 by extended mountings 104. The suspended one or more positionable objects 105 are selectively relocated by the one or more planar motion mechanisms 106 past retracted mountings 104 within the frame 101. In a preferred embodiment, the one or more positionable objects 105 comprise a rectangular prismatic configuration. However, an infinite number of configurations are possible. In a preferred embodiment, the one or more positionable objects 105 measure approximately twelve inches tall, twelve inches deep, and twenty inches wide. These measurements are significant in that they are large enough to fit almost any general kitchen appliance. In one embodiment, the one or more positionable objects 105 comprise a lightweight metal, such as aluminum, magnesium, titanium, beryllium alloys, or combinations thereof. In another embodiment, the one or more positionable objects 105 comprise plastic. Because the one or more positionable objects 105 are selectively relocated one at a time and are, therefore, suspended in air rather than stacked on top of each, the one or more positionable objects 105 do not have the same structural requirements that they would if they had to bear the weight of other positionable objects 105. Therefore, the one or more positionable objects 105 can comprise lighter, thinner, and more economical materials, which saves overall manufacturing costs. They can also be placed closer together, which further optimizes space. In one embodiment, a space between the one or more positionable objects on each side measures approximately one-half inch. In one embodiment, the one or more positionable objects 105 comprise storage bins. In one embodiment, the storage bins are open at the top. In another embodiment, the storage bins are open on a side. In another embodiment, the one or more positionable objects 105 comprise appliances selected from the group consisting of microwaves, refrigerators, ice machines, heaters, toasters, mixers, ovens, juicers, dryers, grinders, dispensers, freezers, gas and electric cook tops, gas and electric ranges, bread machines, humidifiers, and grills. Such appliances can be inserted directly into the automated storage and retrieval system 100 without being placed into a storage bin. In one embodiment, the one or more positionable objects 105 comprise connection points 513 that mate with the one or more planar motion mechanisms 106 and the mountings 104. In one embodiment, the one or more planar motion mechanisms 106 mate with the one or more positionable objects 105 at the connection points 513, such that the one or more planar motion mechanisms 106 can lift and relocate the one or more positionable objects 105 to a designated location. Mountings 104 adjacent to the designated location extend to mate with the connection points 513 of the selected one of the one or more positionable objects 105. The selected one of the one or more positionable objects 105 is then suspended from extended mountings 104 and remains in place until retrieved by the one or more planar motion mechanisms 106. In one embodiment, the connection points 513 are rectangular apertures in the one or more positionable objects 105 and the mountings 104 extend into the apertures to suspend the one or more positionable objects 105. In another embodiment, the connection points 513 comprise magnets, and the mountings 104 comprise complimentary magnets that mate with the magnets in the connection points 513. In a preferred embodiment, the connection points 513 are arranged with two connection points 513 on each of two opposite faces of each of the one or more positionable objects 105. On each of the opposite faces, the two connection points 513 are lined up vertically.

Figure 6:
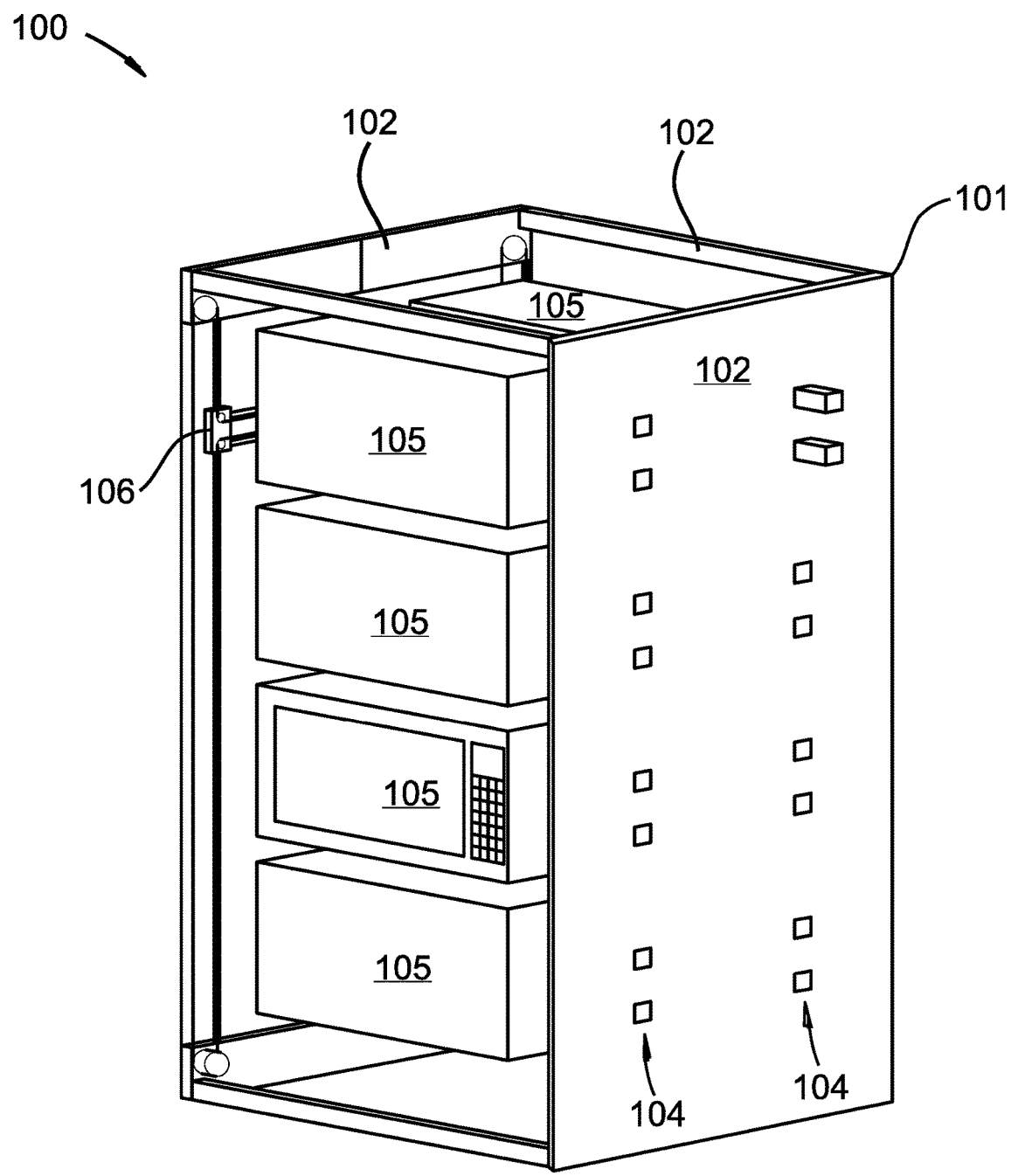
FIG. 6 depicts an embodiment of an automated storage and retrieval system with two columns of the one or more positionable objects.

In one embodiment, the one or more positionable objects 105 are arranged in two columns within the frame 101. FIG. 6 depicts an embodiment of an automated storage and retrieval system 100 with two columns of the one or more positionable objects 105. Each of the one or more positionable objects 105 is individually suspended from the one or more walls 102 via extended mountings 104. In a preferred embodiment, the one or more positionable objects 105 are each suspended from four mountings 104, with two mountings 104 on each of two opposite sides of each of the one or more positionable objects 105. In one embodiment, the one or more positionable objects 105 are arranged such that a space between the one or more positionable objects 105 on each side measures approximately one-half inch. In another embodiment, the one or more positionable objects 105 are placed with no space between the one or more positionable objects 105. The one or more positionable objects 105 are selectively relocated past retracted mountings 104 within the frame 101 by the one or more planar motion mechanisms 106. The one or more planar motion mechanisms 106 selectively relocate one positionable object 105 at a time. When one of the one or more positionable objects 105 is being relocated by the one or more planar motion mechanisms 106, that positionable object 105 is no longer suspended by the mountings 104, which retract into the one or more walls 102, but it is instead suspended by the one or more planar motion mechanisms 106. Once the one or more planar motion mechanisms 106 complete a relocation of one of the one or more positionable objects 105, that positionable object 105 is reattached to the one or more walls 102 by extended mountings 104 that are adjacent to the new location. Because each of the one or more positionable objects 105 is moveable in a horizontal and a vertical direction, it is possible for each positionable object 105 to be moved to any position within the frame 101 by rearranging the one or more positionable objects 105.

Figure 7:
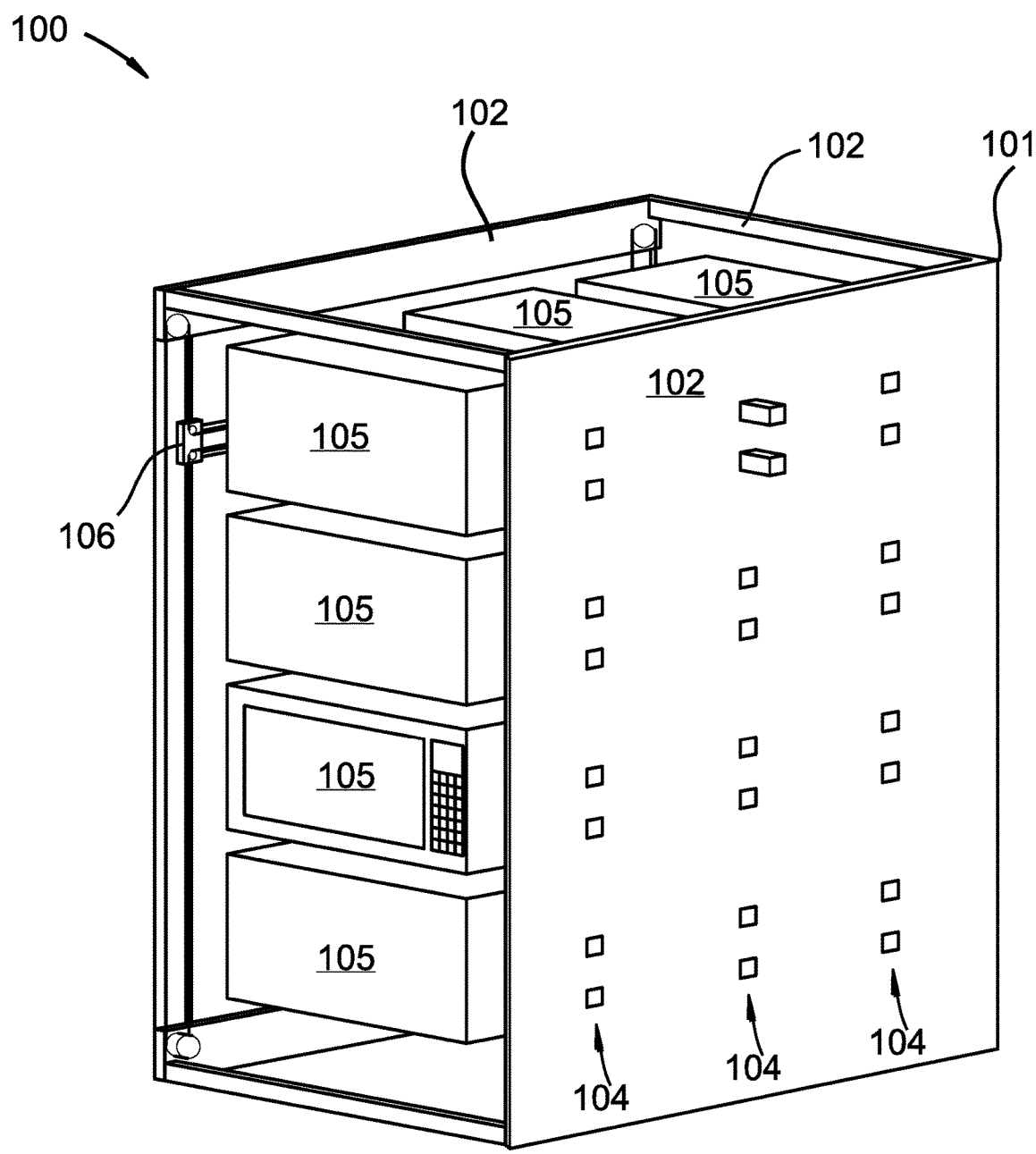
FIG. 7 depicts an embodiment of an automated storage and retrieval system with three columns of the one or more positionable objects.

In some embodiments, the one or more positionable objects 105 are arranged in three or more columns within the frame 101. FIG. 7 depicts an embodiment of an automated storage and retrieval system 100 with three columns of the one or more positionable objects 105. In other embodiments, the one or more positionable objects 105 are arranged in more than three columns within the frame 101. Each additional column of the one or more positionable objects 105 requires additional actuators 103, a larger frame 101, and larger of the one or more planar motion mechanisms 106. However, the general design of the present invention is capable of accommodating many additional columns of positionable objects 105.

Figure 8A:
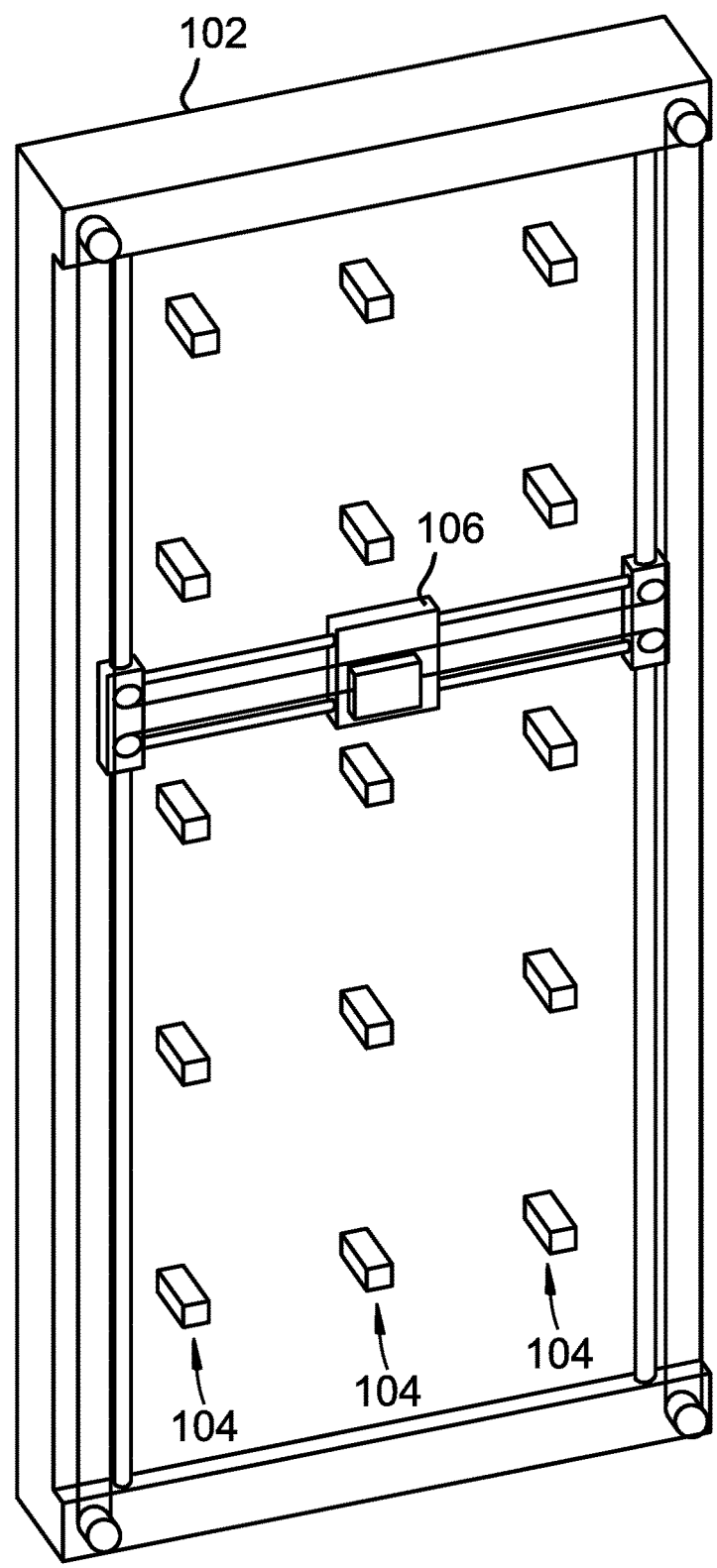
FIG. 8A depicts an embodiment of the one or more planar motion mechanisms moving past retracted mountings.
Figure 8B:
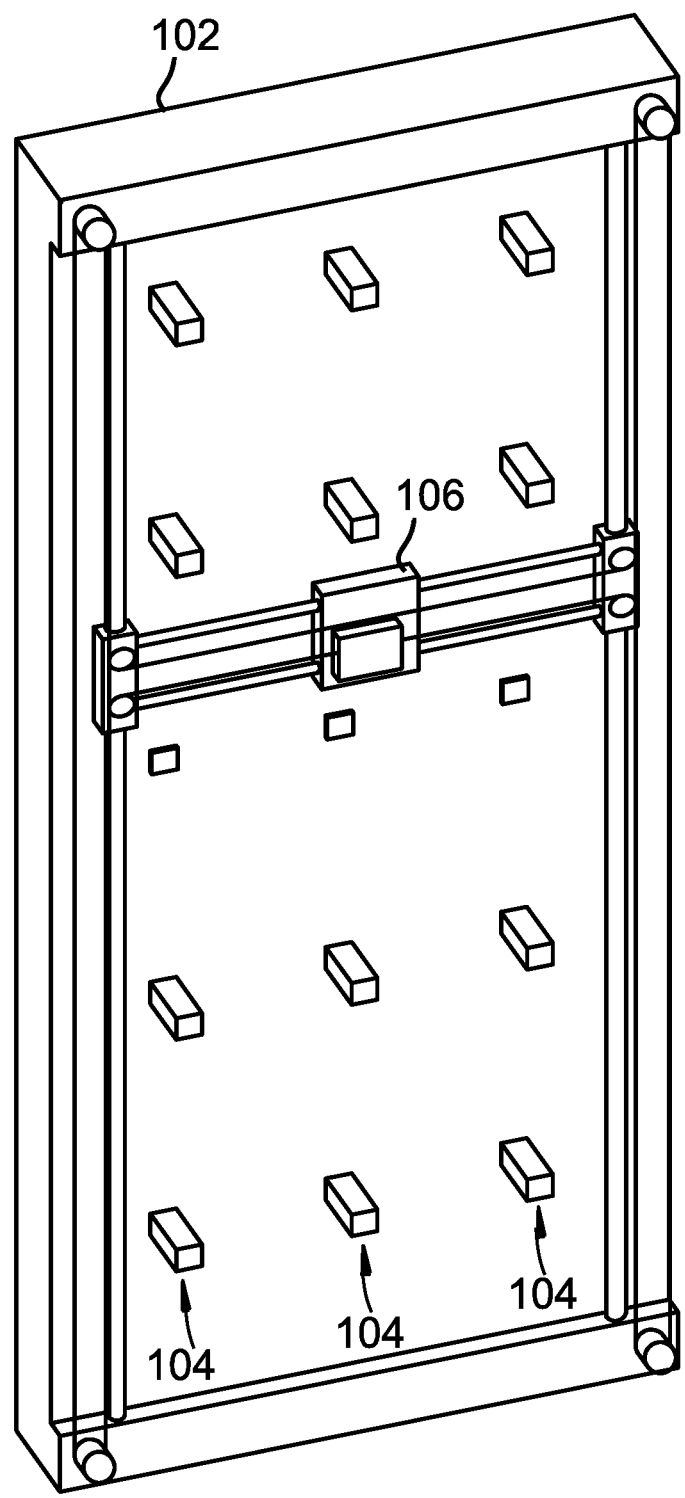
FIG. 8B depicts an embodiment of the one or more planar motion mechanisms moving past retracted mountings.
Figure 8C:
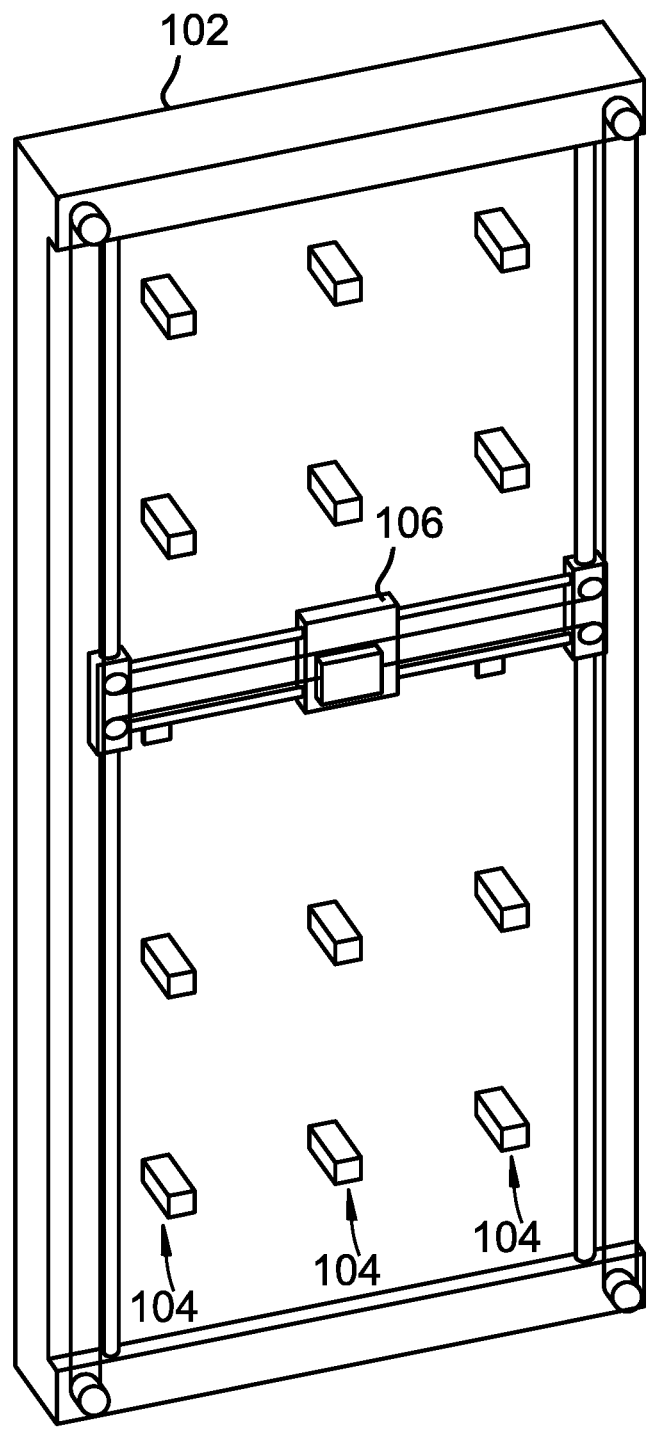
FIG. 8C depicts an embodiment of the one or more planar motion mechanisms moving past retracted mountings.
Figure 8D:
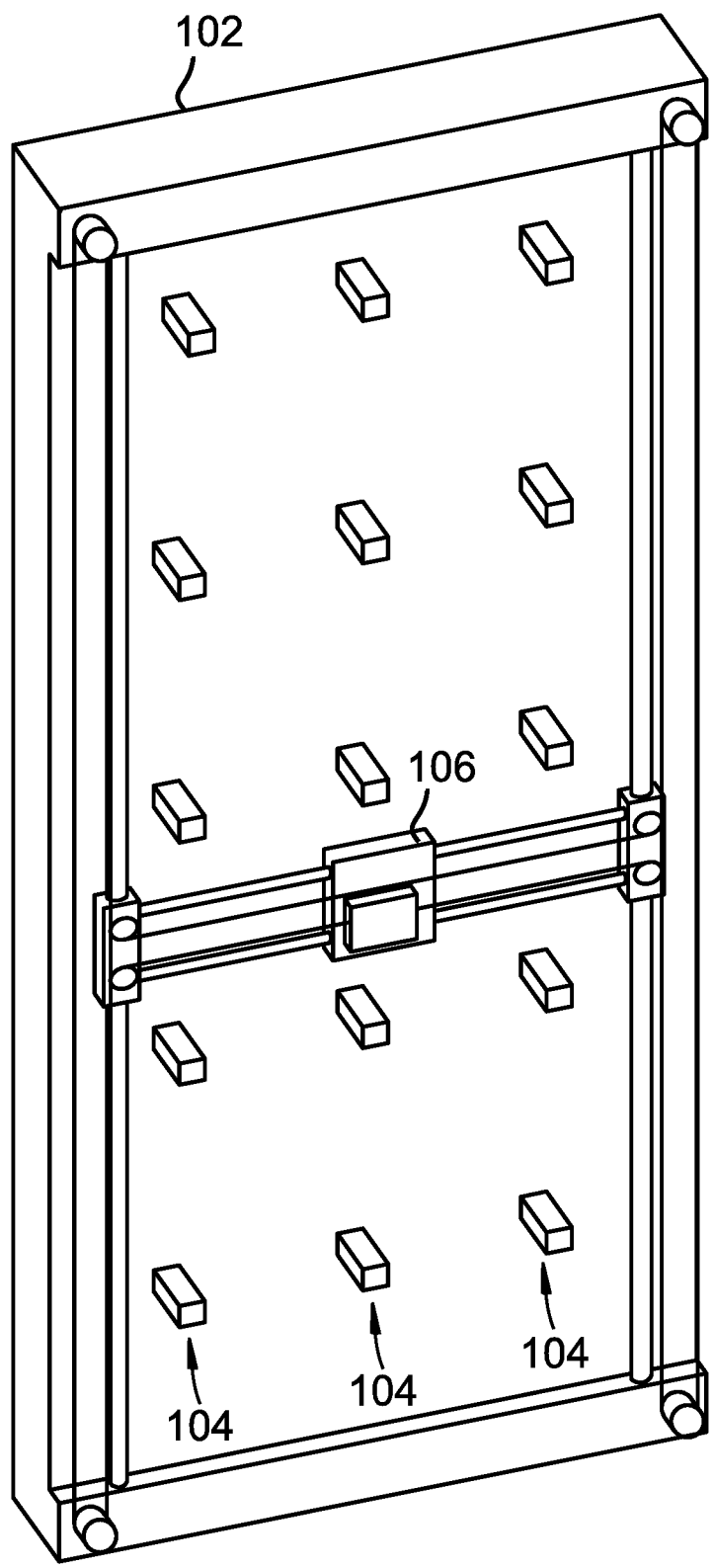
FIG. 8D depicts an embodiment of the one or more planar motion mechanisms moving past retracted mountings.

FIG. 8A-FIG. 8D depict embodiments of the one or more planar motion mechanisms 106 moving past retracted mountings 104. The one or more planar motion mechanisms 106 selectively relocate the suspended one or more positionable objects 105 past retracted mountings 104 within the frame 101. In FIG. 8A, the one or more planar motion mechanisms 106 is positioned between two rows of extended mountings 104. In FIG. 8B, a row of mountings 104 is retracted to allow the one or more planar motion mechanisms 106 to pass. In FIG. 8C, the one or more planar motion mechanisms 106 is moving past the row of mountings 104. In FIG. 8D, the one or more planar motion mechanisms 106 has moved past the row of mountings 104 and the row of mountings 104 has returned to an extended position. The extended mountings 104 are suspending one or more positionable objects 105 (not shown). As each row of mountings 104 retracts to let the one or more planar motion mechanisms 106 pass by, a second row of mountings 104 remains extended and attached to the one or more positionable objects 105 in order to suspend the one or more positionable objects 105 (not shown).

Figure 9A:
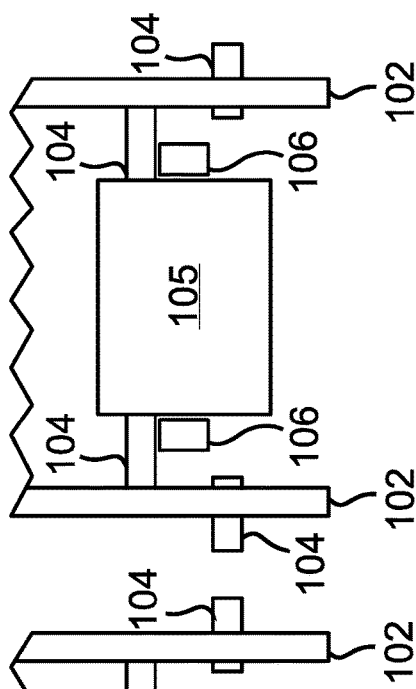
FIG. 9A depicts a two-dimensional view of one embodiment of the one or more planar motion mechanisms moving past retracted mountings with the suspended one or more positionable objects included in the view.
Figure 9B:
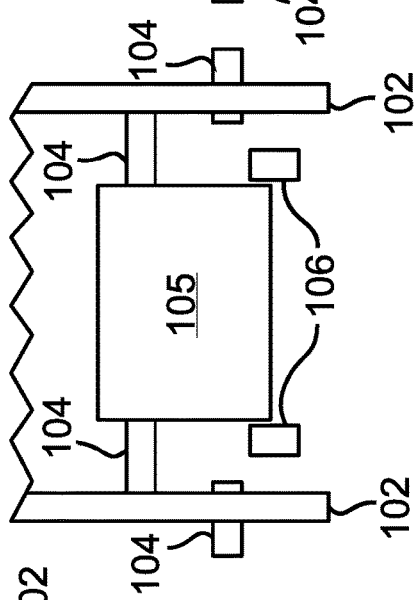
FIG. 9B depicts a two-dimensional view of one embodiment of the one or more planar motion mechanisms moving past retracted mountings with the suspended one or more positionable objects included in the view.
Figure 9C:
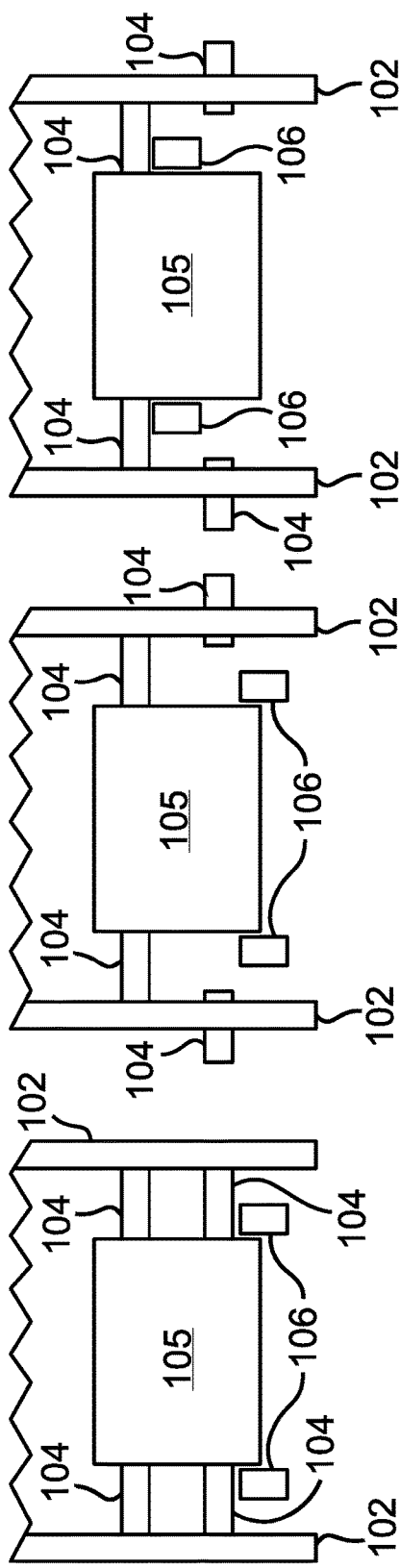
FIG. 9C depicts a two-dimensional view of one embodiment of the one or more planar motion mechanisms moving past retracted mountings with the suspended one or more positionable objects included in the view.
Figure 9D:
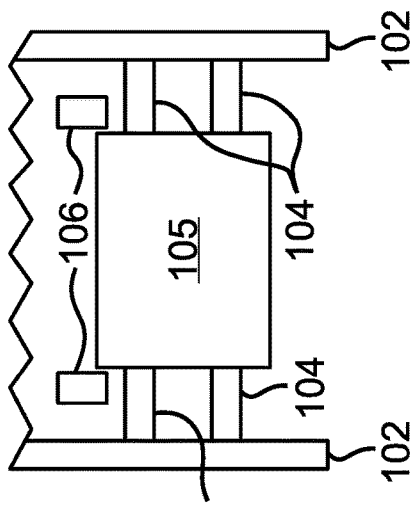
FIG. 9D depicts a two-dimensional view of one embodiment of the one or more planar motion mechanisms moving past retracted mountings with the suspended one or more positionable objects included in the view.
Figure 9E:
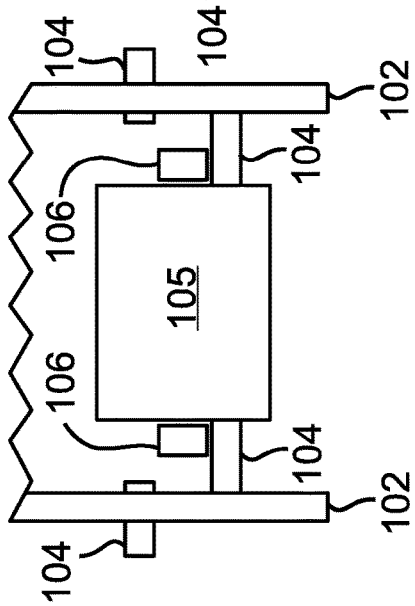
FIG. 9E depicts a two-dimensional view of one embodiment of the one or more planar motion mechanisms moving past retracted mountings with the suspended one or more positionable objects included in the view.
Figure 9F:
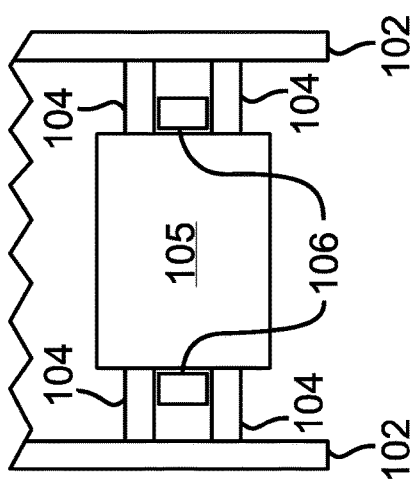
FIG. 9F depicts a two-dimensional view of one embodiment of the one or more planar motion mechanisms moving past retracted mountings with the suspended one or more positionable objects included in the view.

FIG. 9A-FIG. 9F depict two-dimensional views of embodiments of the one or more planar motion mechanisms 106 moving past retracted mountings 104 with the suspended one or more positionable objects 105 included in the view. FIG. 9A depicts one positionable object 105 suspended from four extended mountings 104. The one or more planar motion mechanisms 106 are positioned below the mountings 104 and are preparing to move vertically past the positionable object 105. In order for the one or more planar motion mechanisms 106 to move past the positionable object 105, the mountings 104 need to be retracted. If all four mountings 104 are retracted simultaneously, the positionable object 105 will fall. Therefore, only some of the mountings 104 are retracted at one time. In FIG. 9B, one set of mountings 104 are retracted to allow the one or more planar motion mechanisms 106 to move past. The positionable object 105 is now suspended by one set of extended mountings 104. In FIG. 9C, the one or more planar motion mechanisms 106 have moved past the retracted mountings 104 and are positioned between the two sets of mountings 104. In FIG. 9D, both sets of mountings 104 are extended and the positionable object 105 is once again supported by both sets of mountings 104. In FIG. 9E, another set of mountings 104 is retracted to allow the one or more planar motion mechanisms 106 to move past. The positionable object 105 is once again suspended by only one set of mountings 104. In FIG. 9F, the one or more planar motion mechanisms 106 have moved past both sets of mountings 104, having successfully moved past the positionable object 105, and the other set of mountings 104 is extended again.

Figure 10A:
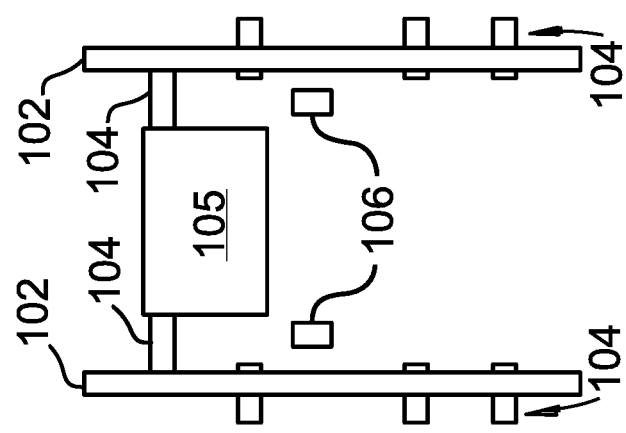
FIG. 10A depicts a two-dimensional view of one embodiment of the one or more planar motion mechanisms selectively relocating one of the suspended one or more positionable objects past retracted mountings.
Figure 10B:
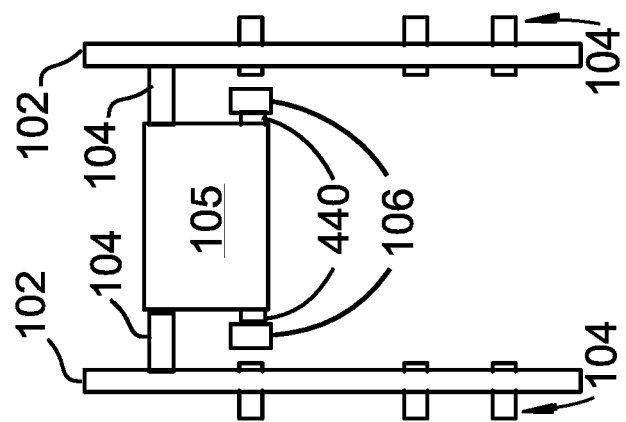
FIG. 10B depicts a two-dimensional view of one embodiment of the one or more planar motion mechanisms selectively relocating one of the suspended one or more positionable objects past retracted mountings.
Figure 10C:
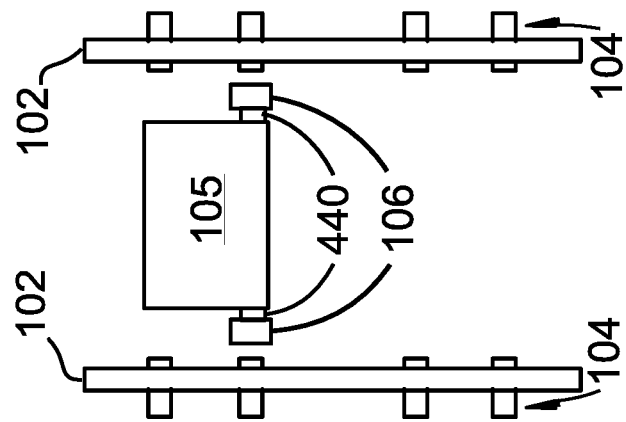
FIG. 10C depicts a two-dimensional view of one embodiment of the one or more planar motion mechanisms selectively relocating one of the suspended one or more positionable objects past retracted mountings.

FIG. 10A-FIG. 10F depict two-dimensional views of embodiments of the one or more planar motion mechanisms 106 selectively relocating one of the suspended one or more positionable objects 105 past retracted mountings 104. In FIG. 10A, the one or more planar motion mechanisms 106 are positioned below one of the one or more positionable objects 105 that was suspended by two sets of extended mountings 104. One set of mountings 104 are retracted to allow the one or more planar motion mechanisms 106 to pass. In FIG. 10B, the one or more planar motion mechanisms 106 have attached to one positionable object 105. The positionable object 105 is now suspended by both the one or more planar motion mechanisms 106 and one set of mountings 104. In FIG. 10C, two sets of mountings 104 are retracted and the one positionable object 105 is suspended solely by the one or more planar motion mechanisms 106. In FIG. 10D, the one positionable object 105 has been relocated by the one or more planar motion mechanisms 106. The positionable object 105 is in a new location adjacent to different mountings 104. In FIG. 10E, one set of mountings 104 are extended and the positionable object 105 is suspended by the extended set of mountings 104 and the one or more planar motion mechanisms 106. In FIG. 10F, the one or more planar motion mechanisms 106 have detached from the positionable object 105 and have moved below the sets of mountings 104. Both sets of mountings 104 are extended, and the positionable object 105 is suspended solely from the extended mountings 104. In each figure, the mountings 104 are retracted when not suspending the one or more positionable objects 105 from the one or more walls 102.

FIG. 11A-FIG. 12D depict the suspended one or more positionable objects 105 being selectively relocated past retracted mountings in sequence. In one embodiment of the automated storage system 100, a microcontroller 430 receives an input from a user of a request for one a target positionable object 1100. The microcontroller 430 recalls from memory a current position of the target positionable object 1100, as well as current positions for other positionable objects 105 within the frame 101, then produces a sequence of movements necessary to bring the target positionable object 1100 to an access port 300. The microcontroller 430 then instructs the motors 429 to carry out each movement in the sequence, and the target positionable object 1100 is relocated past retracted mountings 104 to be brought to the access port 300.

FIG. 11A-FIG. 11E depict the suspended one or more positionable objects 105 being selectively relocated past retracted mountings 104 in a revolving clockwise or counterclockwise sequence. In one embodiment, the microcontroller 430 is programmed to selectively relocate the one or more positionable objects 105 in this sequence. In this sequence, the one or more positionable objects 105 are moved in a circular motion by moving a single positionable object 105 horizontally from a position in a first column to a first vacant space 1110 in a second column of positionable objects 105, as depicted in FIG. 11A, leaving behind a second vacant space 1120 in the first column, as depicted in FIG. 11B. Then, all remaining positionable objects 105 in the first column are moved vertically to fill the second vacant space 1120, as depicted in FIG. 11B, leaving behind a third vacant space 1130 located in the first column, as depicted in FIG. 11C. A positionable object 105 from the second column is moved horizontally into the first column to fill the third vacant space 1130, as depicted in FIG. 11C, leaving behind a fourth vacant space 1140 located in the second column, as depicted in FIG. 11D. Finally, all remaining positionable objects 105 in the second column are moved vertically to fill the fourth vacant space 1140, as depicted in FIG. 11D, leaving behind a fifth vacant space 1150 in the second column, as depicted in FIG. 11E. This process is repeated until a target positionable object 1100 has reached an access port 300. A similar sequence is followed when there are three or more columns of the one or more positionable objects 105 within the frame 101.

Figure 12A:
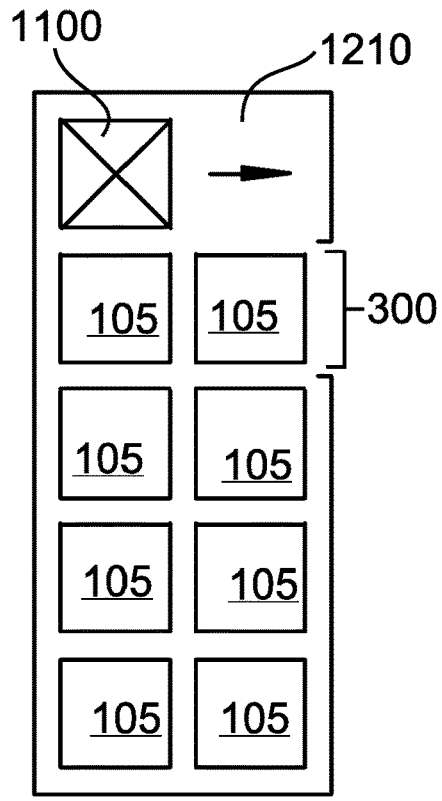
FIG. 12A depicts the suspended one or more positionable objects being selectively relocated past retracted mountings in a non-revolving sequence.
Figure 12B:
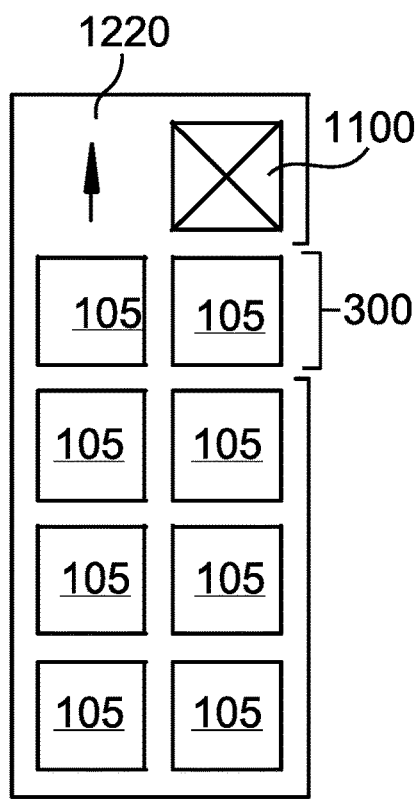
FIG. 12B depicts the suspended one or more positionable objects being selectively relocated past retracted mountings in a non-revolving sequence.
Figure 12C:
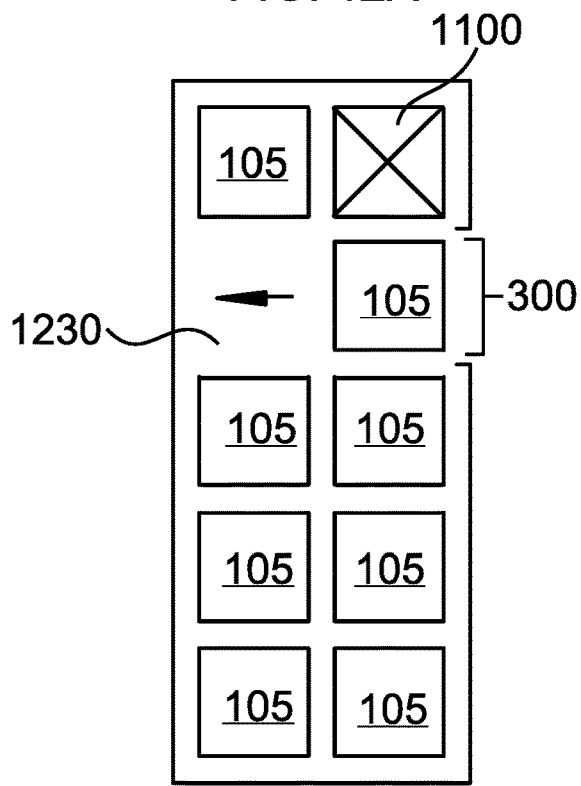
FIG. 12C depicts the suspended one or more positionable objects being selectively relocated past retracted mountings in a non-revolving sequence.
Figure 12D:
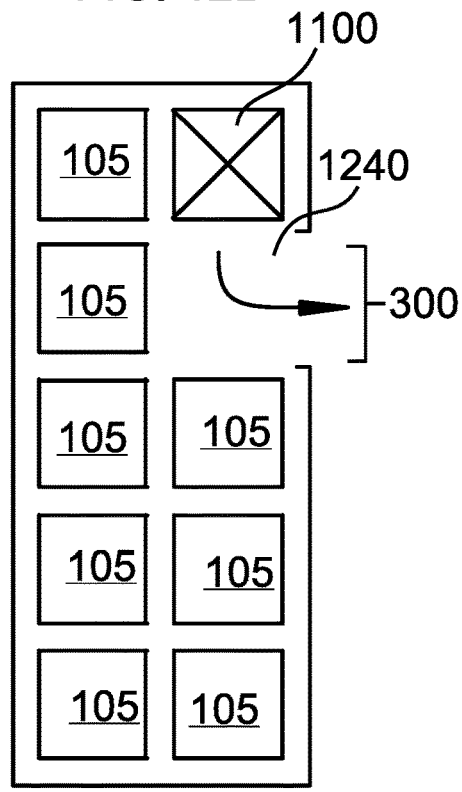
FIG. 12D depicts the suspended one or more positionable objects being selectively relocated past retracted mountings in a non-revolving sequence.

FIG. 12A-FIG. 12D depict the suspended one or more positionable objects 105 being selectively relocated past retracted mountings 104 in a non-revolving sequence. In one embodiment, the microcontroller 430 is programmed to selectively relocate the one or more positionable objects 105 in this sequence. In this sequence, the one or more positionable objects 105 are moved in a sequence that entails the least number of moves that are possible. A single positionable object 105 is moved horizontally from a position in a first column to a first vacant space 1210 in a second column of positionable objects 105, as depicted in FIG. 12A, leaving behind a second vacant space 1220 in the first column, as depicted in FIG. 12B. Then, a positionable object 105 in the first column is moved vertically to fill the second vacant space 1220, as depicted in FIG. 12B, leaving behind a third vacant space 1230 located in the first column, as depicted in FIG. 12C. A positionable object 105 from the second column is moved horizontally into the first column to fill the third vacant space 1230, as depicted in FIG. 12C, leaving behind a fourth vacant space 1240 located in the second column, as depicted in FIG. 12D. This process is repeated until a target positionable object 1100 has reached an access port 300. Moving the one or more positionable objects 105 in this sequence, rather than in a circular sequence, reduces the amount of time needed to access a target positionable object in most cases. Also, a natural consequence of the method is that often-used positionable objects 105 will remain near an access port 300, and be, therefore, quickly accessible, while infrequently-used positionable objects 105 will remain at the farthest distances, which increases efficiency. Furthermore, moving one positionable object 105 at a time in a non-circular sequence in this manner makes it possible for the automated storage and retrieval system 100 to function even when not all positions within the columns within the frame 110 are filled with positionable objects 105. A similar sequence is followed when there are three or more columns of the one or more positionable objects 105 within the frame 101.

Figure 13:
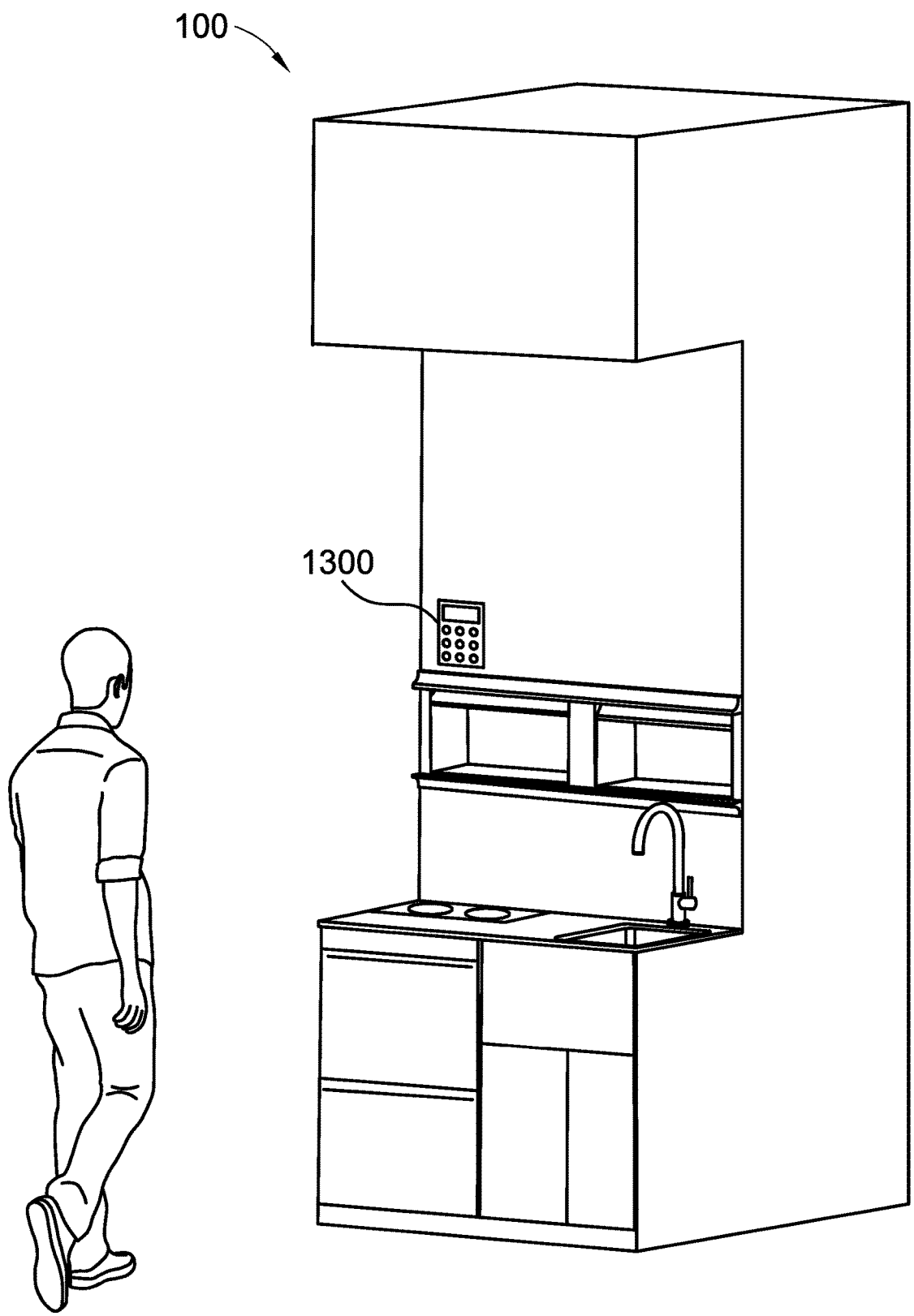
FIG. 13 depicts an automated storage and retrieval system comprising a user interface.

FIG. 13 depicts an automated storage and retrieval system 100 comprising a user interface 1300. In a preferred embodiment, the user interface 1300 comprises a voice control user interface. In other embodiments, the user interface 1300 comprises buttons or a touch-sensitive display on a mobile device. In one embodiment, a user assigns customizable identifiers to the one or more positionable objects 105 via the user interface 1300. In one embodiment, the user interface 1300 comprises a timer. The timer alerts the user when a target positionable object 105 arrives at an access port 300. In one embodiment, the user assigns codes to the one or more positionable objects 105 relative to the degree of use via the user interface 1300.

The invention claimed is:
1. An automated storage and retrieval system for storing and retrieving a plurality of objects comprising:
a first vertical wall;
a first plurality of mountings on the first wall, each mounting configured to be actuated between a retracted position and an extended position;
a planar motion mechanism configured to move objects along the wall between a first storage position and a second storage position;
wherein each of the mountings in the first plurality of mountings is configured to be actuated into the extended position in order to suspend one of the objects when that object is in its first storage position and not being moved by the planar motion mechanism and is likewise configured to be actuated into the retracted position when the planar motion mechanism is moving that object past the respective mounting as it travels to its second storage position.
2. The invention of claim 1, further comprising a second vertical wall, parallel to and spaced apart the first vertical wall and a second plurality of mountings on the second vertical wall, each configured to be actuated between a retracted position and an extended positions, wherein the second plurality of mountings are configured to be actuated in similar fashion to and synchronized with the first plurality of mountings.
3. The invention of claim 1 wherein the objects are arranged in two columns.
4. The invention of claim 1, wherein the objects are arranged in three or more columns.
5. The invention of claim 1, wherein the objects comprise connection points that mate with the planar motion mechanism and the mountings.
6. The invention of claim 5, wherein the planar motion mechanism comprises connectors that extend from and retract into the planar motion mechanism by means of actuators.
7. The invention of claim 1, wherein actuation of the mountings is controlled by mechanical switches positioned between rows of the mountings.
8. The invention of claim 1, wherein the actuation of the mountings is controlled by a microcontroller.
9. The invention of claim 1, wherein the mountings are actuated by solenoids.
10. The invention of claim 1, wherein the mountings comprise electrical conductors.
11. The invention of claim 1, wherein the planar motion mechanism comprise electrical conductors.
12. The invention of claim 1, wherein the objects are storage bins.
13. The invention of claim 1, wherein the objects are appliances, each selected from a group consisting of microwave ovens, refrigerators, ice machines, heaters, toasters, mixers, ovens, juicers, dryers, grinders, dispensers, freezers, gas and electric cook tops, gas and electric ranges, bread machines, humidifiers, and grills.

14. The invention of claim 1, wherein the planar motion mechanism is an H-bot.

15. The invention of claim 1, further comprising one or more access ports, each access port comprising a window that provides access to only one object at a time.

16. The invention of claim 1, wherein the planar motion mechanism is configured to move objects in a loop.

17. The invention of claim 1, wherein the planar motion mechanism is configured to move the objects in non-circuitous paths.

18. The invention of claim 1, further comprising a user interface.

19. The invention of claim 18, wherein the user interface is adapted for voice control.

20. The invention of claim 18, wherein the user interface is configured to provide the user automatic access to an object specified by the user.

* * * * *